United States Patent [19]

Maruyama

[11] 4,366,891

[45] Jan. 4, 1983

[54] PUSH ROD ASSEMBLY FOR A CLUTCH MASTER CYLINDER

[75] Inventor: Teruo Maruyama, Chita, Japan

[73] Assignee: Aisin Seiki Kabushiki Kaisha, Kariya, Japan

[21] Appl. No.: 192,438

[22] Filed: Sep. 29, 1980

[30] Foreign Application Priority Data

Sep. 29, 1979 [JP] Japan ............................ 54-134943[U]

[51] Int. Cl.³ ...................... F16D 3/12; F16D 25/12
[52] U.S. Cl. .................................. 192/99 S; 74/470; 74/582; 192/30 V; 192/109 F; 192/110 R
[58] Field of Search .............. 192/30 V, 99 S, 110 R, 192/111 R, 109 A, 109 F; 74/470, 582; 188/380

[56] References Cited

U.S. PATENT DOCUMENTS

| | | | |
|---|---|---|---|
| 2,026,447 | 12/1935 | Trott | 192/99 S |
| 2,232,847 | 2/1941 | Geyer | 192/99 S |
| 2,297,913 | 10/1942 | Phelps | 192/99 S |
| 4,263,998 | 4/1981 | Moriya | 192/110 R |

FOREIGN PATENT DOCUMENTS 249972  4/1926  United Kingdom ................. 74/582

*Primary Examiner*—Rodney H. Bonck
*Attorney, Agent, or Firm*—Oblon, Fisher, Spivak, McClelland & Maier

[57] ABSTRACT

A push rod assembly for a clutch master cylinder having a rod in abutment with a piston of the clutch master cylinder, a clevis operatively connected to a clutch pedal, and a rubber vibration isolator interposed between the rod and the clevis wherein the rod is formed by stamp forging, the clevis is formed by press working and the rubber vibration isolator is secured to the rod and the clevis during forming thereof, thereby decreasing the resulting cost and increasing the intensity of adhesion thereof.

3 Claims, 2 Drawing Figures

PUSH ROD ASSEMBLY FOR A CLUTCH MASTER CYLINDER

BACKGROUND OF THE INVENTION

1. Field of the Invention

This invention relates to a push rod assembly for a clutch master cylinder.

2. Description of the Prior Art

Upon clutch engagement, severe vibration is transmitted from an engine to a clutch pedal through a clutch release mechanism with the result that an uncomfortable feeling is communicated to the driver and clutch release operation may not be smoothly accomplished. Such phenomena occurs to a pronounced degree in a diesel automobile.

In order to prevent such transmission of vibrations to the clutch pedal, a push rod assembly for a clutch master cylinder has been provided wherein a sub-rod having a flange at one end thereof and a clevis having a flange opposite to the flange of the sub-rod are connected via a rubber vibration isolator interposed between both flanges. The rubber vibration isolator is adhered to the opposing ends of the sub-rod and the clevis by means of a bonding agent. However, both the sub-rod and the clevis are obtained by cutting a round bar so that production costs are subject to large increases. In addition, it takes considerably long time to dry the bonding agent and the desired strong intensity of adhesion is thus not sufficiently obtained.

SUMMARY OF THE INVENTION

It is, therefore, one of the objects of this invention to provide a push rod assembly for a clutch master cylinder without the aforementioned difficulties.

It is another object of this invention to provide a push rod assembly for a clutch master cylinder wherein a sub-rod has a flange at one end thereof formed by stamp forging, a clevis having a generally U-shaped member obtained by pressing work, an annular plate welded to the U-shaped member so as to be opposed to the flange of the sub-rod, and a rubber vibration isolator secured at each side thereof to the flange of the sub-rod and to the annular plate during the molding process of the rubber vibration isolator.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENT

Figure 1:
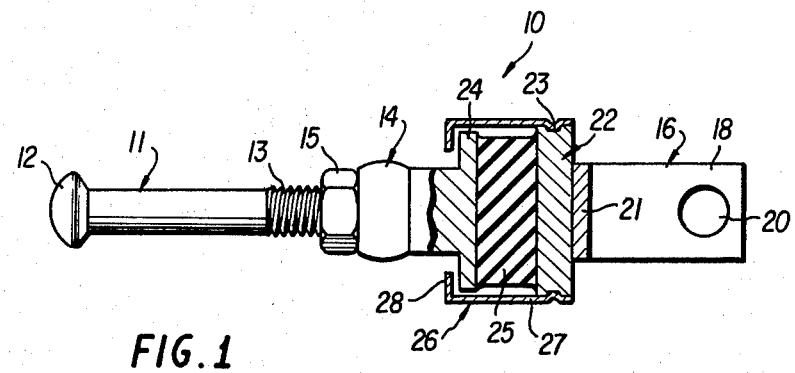
FIG. 1 is an elevational view, partly in section, of one embodiment of the present invention.
Figure 2:
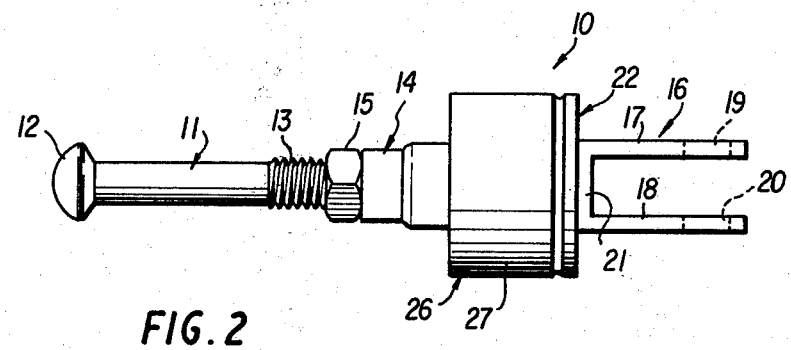
FIG. 2 is a plane view of the embodiment of FIG. 1.

Referring now to FIGS. 1 and 2, there is illustrated a push rod assembly 10 for a clutch master cylinder (not shown). The push rod assembly 10 has a rod 11 having at the left end portion thereof a spherical portion 12 which is in abutment with a movable piston (not shown) of the clutch master cylinder. The right end portion 13 of the rod 11 is screwed into a sub-rod 14 to enable the adjustment of axial length of the rod 11 so that the piston of the clutch master cylinder may be positioned at the retracted position thereof. The rod 11 and the sub-rod 14 are tightly connected with each other by a nut 15 threadably mounted on the right end portion 13 of the rod 11. Both of the rod 11 and the sub-rod 14 are formed by a thread cutting operation after stamp forging.

Reference numeral 16 designates a clevis constituting a generally U-shaped iron member. Clevis 16 is provided at right end portions 17 and 18 thereof with a pair of concentric holes 19 and 20 respectively through which a pin (not shown) is passed to connect a clutch pedal (not shown) thereto. Clevis 16 is formed by press work and the left end portion 21 thereof is connected to the right surface portion of an annular plate 22 formed by press working and includes a circumferential groove 23 formed along the entire outer periphery thereof.

Sub-rod 14 is formed at right end thereof with a flanged portion 24 the radius of which is slightly smaller than that of the annular plate 22. Between annular plate 22 and flanged portion 24 is provided a rubber vibration isolator 25 to prevent transmission of vibrations from the flanged portion 24 to annular plate 22.

In order to produce the rubber vibration isolator 25, a vulcanization process is available. Such vulcanization process involves the method of thermal treating crude rubber, synthetic rubber or other plastic rubber-like material with sulfur or a compound of a sulfur to decrease its plasticity, tackiness, and sensitivity to heat and cold and to give it elasticity, strength, and other useful properties. Synthetic rubber immediately after vulcanization is in fluid-state and may be easily formed into any desired shape. Therefore, the rubber vibration isolator 25 by which the annular plate 22 and the flanged portion 24 of the rod 12 are tightly connected with each other may be obtained by impregnating synthetic rubber in fluid-state into a spaced portion between annular plate 22 and flanged portion 24 of the sub-rod 14 both of which are co-axially positioned in a mold (not shown). During transition from fluid-state to solid-state of the synthetic rubber, the synthetic rubber is cooled gradually and is secured to the annular plate 22 and the flanged portion 24 of the sub-rod 14.

Reference numeral 26 designates a cover member having a cylindrical portion 27 secured at the right end portion thereof to the circumferential groove 23 by calking and surrounding the rubber vibration isolator 25 and flanged portion 24 of the sub-rod 14. Cover member 26 also includes an annular stem 28 extended radially inwardly from the left end portion of cylindrical portion 27. Stem 28 is located in closely spaced relationship to the flanged portion 24 of the sub-rod 14. Thus, the connection between the sub-rod 14 and clevis 16 is maintained due to engagement between the stem 28 of the cover member 26 with the flanged portion 24 of the sub-rod 14 even upon separation of the rubber vibration isolator 25 from the annular plate 22 or the flanged portion 24 of the sub-rod 14.

Alternately, the rod 11 and the sub-rod 14 may be formed as one unit, and the circumferential groove 23 may be provided on the outer periphery of the flanged portion 24 of the sub-rod 14. As mentioned above in detail, according to the present invention, a push rod assembly for a clutch master cylinder may be obtained at low cost in comparison with that which is conventional since the rod and sub-rod are formed by stamp forging and the clevis is formed by press working. Further, the rubber vibration isolator is secured to the flanged portion of the sub-rod and the annular plate welded to the clevis during the forming process of the vibration isolator so as to thereby eliminate the bonding agent and drying time to therefore decrease cost and to obtain a desired strong intensity in adhesion.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A push rod assembly for a clutch master cylinder having a piston for use in conjunction with a clutch pedal comprising:
    a stamp forged rod having a spherical portion in abutment with said piston of said clutch master cylinder at one end portion thereof and a flanged portion at an opposite end portion thereof,
    a press worked annular plate co-axially opposed to said flanged portion of said rod,
    a press worked, U-shaped clevis connected to said annular plate at one end thereof and having a forked end portion operatively connected to said clutch pedal at the other end thereof,
    a rubber vibration isolator secured to said flanged portion of said rod and said annular plate by being interposed therebetween during forming of said rubber vibration isolator,
    a cover member having a cylindrical portion surrounding said rubber vibration isolator and said flanged portion of said rod, and
    an annular stem member extended radially inwardly from one end of said cylindrical portion, wherein said cylindrical portion is secured to an outer peripheral portion of said annular plate at an opposite end thereof and wherein said annular stem is located in closely spaced relationship to said flanged portion of said rod.

2. A push rod assembly for a clutch master cylinder in accordance with claim 1 wherein an opposite end portion of said cylindrical portion of said cover member is calked at a circumferential groove provided on said outer periphery of said annular plate so as to be secured thereto.

3. A push rod assembly for a clutch master cylinder in accordance with claim 2 wherein said rod comprises a first rod including said spherical portion and a second rod including said flange wherein said first rod is screwed into said second rod for axial length adjustment.

* * * * *